Dec. 18, 1951 R. C. CURTIS ET AL 2,578,924

INDUCTIVE PICKUP DEVICE

Filed Sept. 14, 1948 3 Sheets-Sheet 1

INVENTORS
Roger C. Curtis
BY Leland D. Norton
Blair, Curtis + Hayward
ATTORNEYS

INDUCTIVE PICKUP DEVICE

Filed Sept. 14, 1948 3 Sheets-Sheet 2

INVENTORS
Roger C. Curtis
BY Leland D. Norton
Blair, Curtis + Hayward
ATTORNEYS

INDUCTIVE PICKUP DEVICE

Filed Sept. 14, 1948 3 Sheets-Sheet 3

INVENTORS
Roger C. Curtis
BY Leland D. Norton
Blair, Curtis + Hayward
ATTORNEYS

Patented Dec. 18, 1951

2,578,924

UNITED STATES PATENT OFFICE 2,578,924

INDUCTIVE PICKUP DEVICE

Roger C. Curtis, New Haven, and Leland D. Norton, Fairfield, Conn., assignors to Dictaphone Corporation, Bridgeport, Conn., a corporation of New York Application September 14, 1948, Serial No. 49,282

4 Claims. (Cl. 179—6)

This invention relates to coupling devices, and more particularly to such devices adapted for coupling to a telephone system for detecting the electrical signals passing therethrough.

This invention provides a device whereby the signals in the telephone system may be detected in order, for example, to permit the recording of telephone conversations, without any direct electrical connection with the telephone system. To this end, there is provided an assembly of pickup coils which is adapted for mounting in proximity to the "induction coil" or audio transformer of a telephone installation, within the stray magnetic field thereof, so that there will be induced in the pickup coils a signal substantially conforming to that in the telephone transformer. Because this transformer usually is magnetically shielded by its housing, the density of stray flux therefrom usually is very low. Accordingly, the weak voltage induced in the pickup coils by this stray flux must be amplified many times in order to render it of an amplitude which is practicably usable. Former pickup arrangements not only were sensitive to the stray flux from the telephone transformer, but also were equally sensitive to stray flux from other electrical devices in the vicinity. Hence the voltages induced in such systems by such other electrical devices have been greatly amplified along with the desired audio voltages to produce a high level of noise or interference in the output signals of the system and in any recording thereof.

It is among the objects of the present invention to provide an inductive coupling device which is range selective—that is, which differentiates between incident fluxes according to the distance of the source. It is also an object of the invention to provide such a device having high sensitivity to flux emanating from certain directions. Another object is the provision of such a device which is compact and adapted for convenient mounting in proximity to the telephone transformer. Further objects are those of providing in such a device the qualities of ruggedness and susceptibility to economical manufacture. These, and additional objects which will be apparent hereinafter, are accomplished by the present invention, a suitable embodiment of which is described in the following specifications and shown in the accompanying drawings, in which, Figure 1 is a perspective view of a pickup device embodying the present invention, with a desk telephone shown in position thereon;

Figures 1, 2:
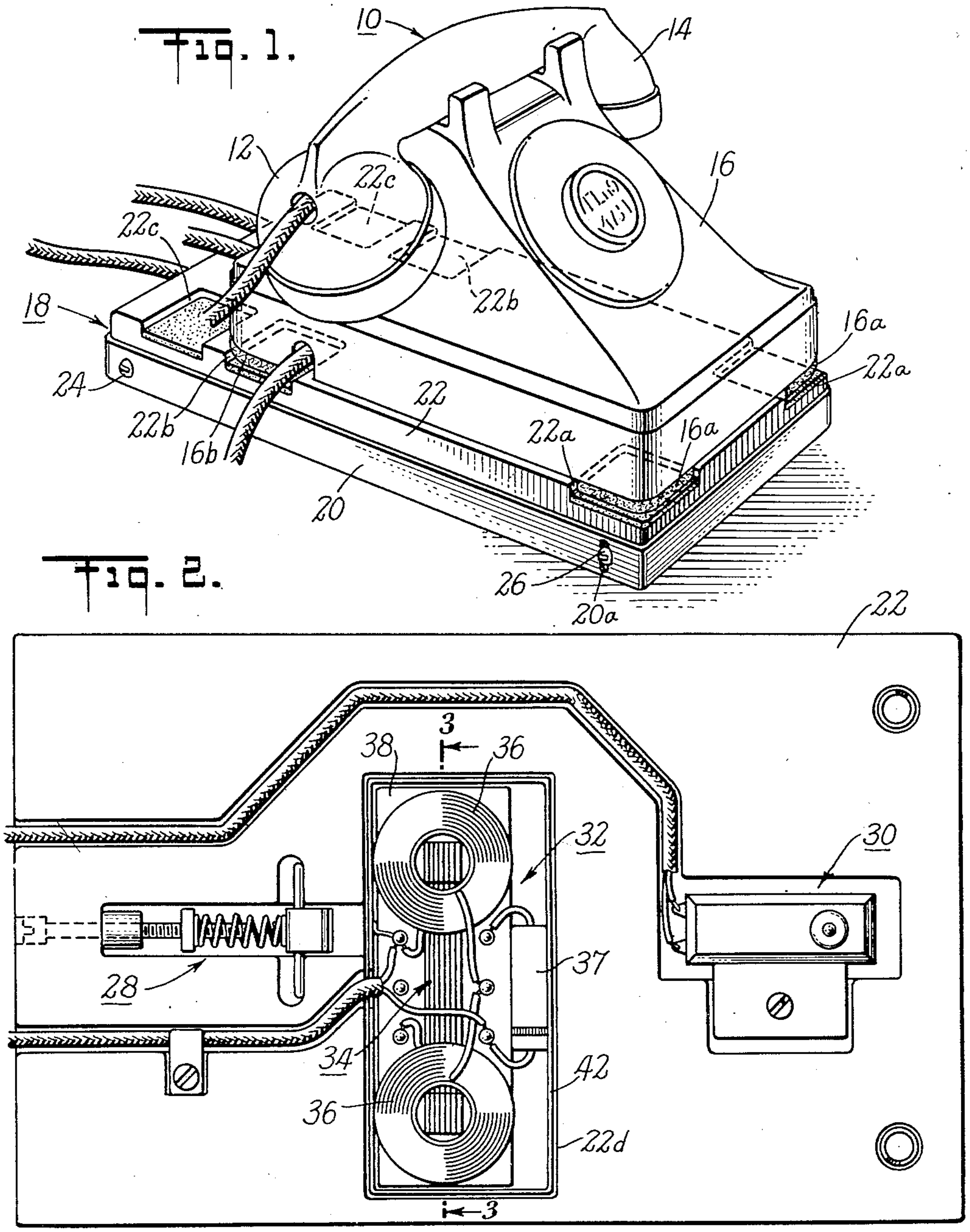
Figure 2 is a bottom plan view of the device, with its bottom cover removed.

The particular coupling device shown in the drawings is adapted for use in conjunction with a telephone of the desk type—that is, of the type shown in Figure 1, having a hand set, generally indicated at 10, on which are mounted the telephone transmitter or microphone 12 and the telephone receiver or earphone 14, and a cradle base 16 adapted to support the hand set 10 when it is not in use. The cradle base 16 also serves to house, among other components of the telephone system, a "telephone induction coil" or audio transformer 40, Figures 4 and 5, through which passes the electrical signals embodying the intelligence transmitted in the system.

The coupling device shown in use with this telephone, and generally indicated at 18, is in the form of a support or pedestal for the cradle base 16 of the telephone. The device comprises a metal tray or sub-base 20 of rectangular shape and having upturned sides to form an upwardly open, shallow box. A platform 22 of corresponding shape but slightly lesser size is received within sub-base 20 and supported for pivotal movement with respect thereto by means of screws 24 (see also Figure 5). The extent of such pivotal movement is limited by means of screws 26 extending through slots 20*a* in the sides of sub-base 20 and into platform 22. A pair of recesses 22*a* are provided in the front corners of the upper side of platform 22 for receiving the front feet or bosses 16*a* of the telephone cradle base and two pairs of similar recesses 22*b* and 22*c* are provided at different distances rearward of the recesses 22*a* to accommodate the rear feet 16*b* of two standard sizes of telephone bases the various recesses being located so as to maintain the telephone transformer in proper position with respect to the pickup coils. A spring mechanism generally indicated at 28, Figure 2, is arranged to urge platform 22 upwardly about screws 24 as a pivot, against the weight of the platform and that of the telephone thereon. A switch, generally indicated at 30, is adapted to be engaged or disengaged depending upon the vertical position of platform 22 relative to sub-base 20, as more fully disclosed in a copending application of L. D. Norton entitled "Telephone Switch," so that removal of hand set 10 from cradle base 16 will actuate the switch to place the recording equipment in condition for recording a telephone conversation.

Figure 3:
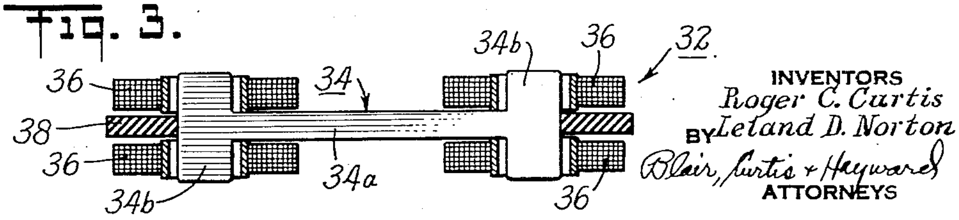
Figure 3 is a vertical section through the pickup coil arrangement of the device.

Mounted within platform 22, suitably in a recess 22*d*, Figure 2, formed in the underside thereof, is a pickup coil structure, generally indicated at 32. As shown more clearly in Figures 3 and 6, this structure 32 comprises a generally flat H-shaped core 34 of magnetic material having an elongated central portion 34*a* with a relatively short upright portion 34*b* extending generally perpendicularly to central portion 34*a* at either end thereof. Each of the upright portions 34*b* thus forms above and below central portion 34*a* a short projecting leg; on each of these projecting legs is mounted a relatively flat coil 36. The four coils 36 are connected in series, as shown in Figures 6 and 7A–D, with the two coils on the upright portion 34*b* at one end of core 34 connected in series opposition with the two coils on the upright portion at the opposite end of the core. A pair of output terminals, A and B, are provided for this pickup coil arrangement, a condenser 37 being connected in series with the four coils between terminal A and the adjacent coil so that only alternating voltages, such as audio signals, will appear across terminals A and B. As is most clearly shown in Figure 6, a plate 38 of insulating material, such as Bakelite, having an opening 38*a* to receive core 34 on its long axis, is placed around core 34 and between coils 36 to provide means for support of core 34, the coils 36, and the wiring connections between the coils.

Figures 4, 5:
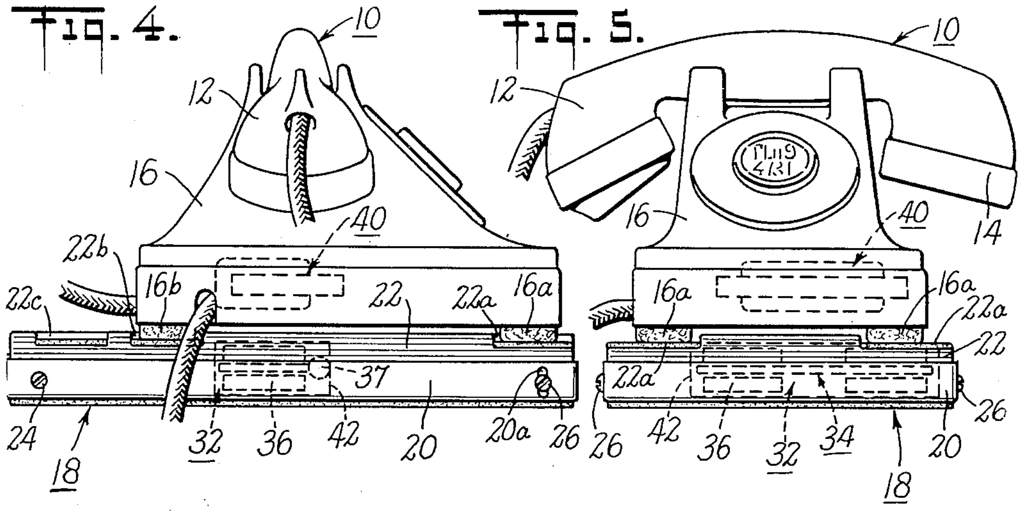
Figures 4 and 5 are respectively side and front elevational views of the device with a desk telephone in place thereon, and with certain portions of the device and telephone dotted in to indicate their relative positions.
Figure 6:
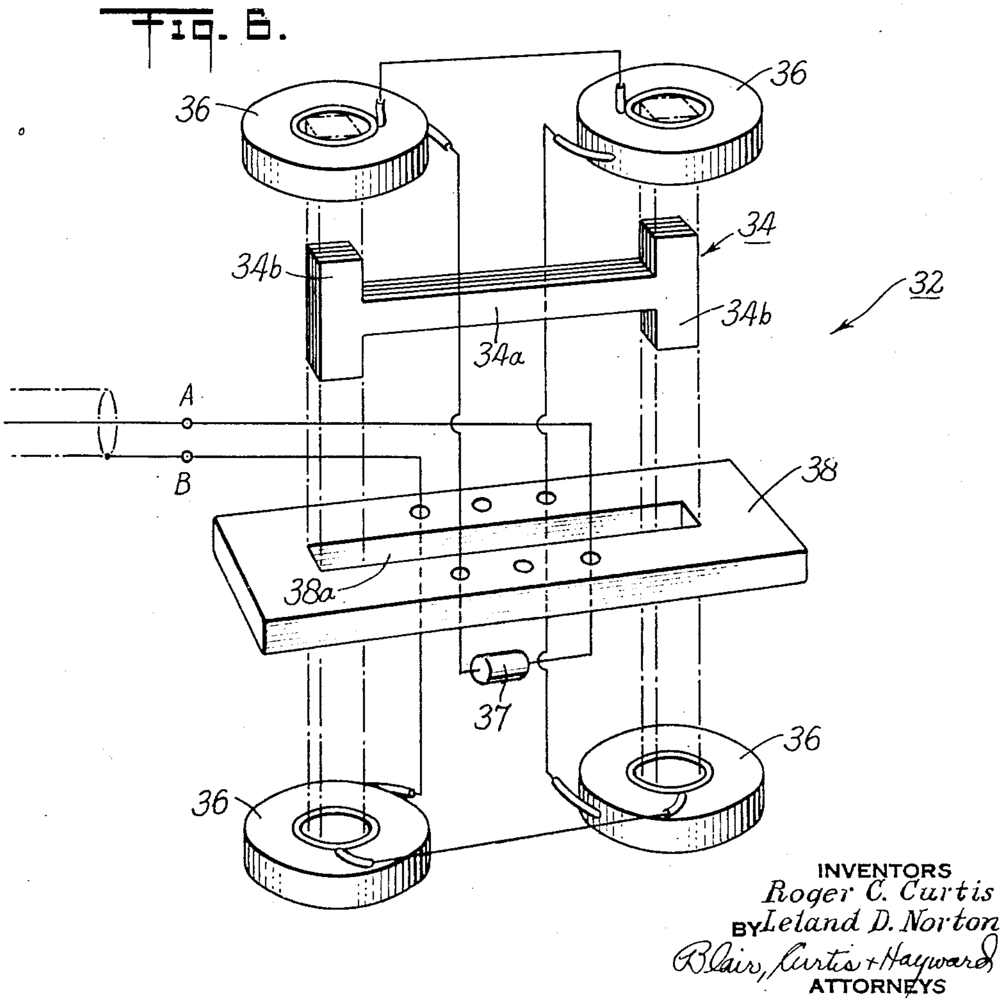
Figure 6 is an exploded perspective view of the pickup coil arrangement showing the electrical connections thereof.

This pickup coil arrangement 32 is so positioned in support 22 as to be opposite the audio transformer 40 within the cradle base 16 of the telephone, as shown in Figures 4 and 5, and is so oriented that the axes of the two upright portions 34*b* are directed toward the audio transformer 40. Thus, the air gap between the ends of the upright portions 34*b*, which form the pole pieces of the pickup coil structure 32, and the audio transformer 40 is reduced to the practicable minimum.

Suitably, the pickup coil arrangement is enclosed in a non-magnetic metal shell 42, Figure 2, to minimize its detection of electrostatic disturbances, without substantial reduction of its sensitivity to electromagnetic fields.

Figure 7A:
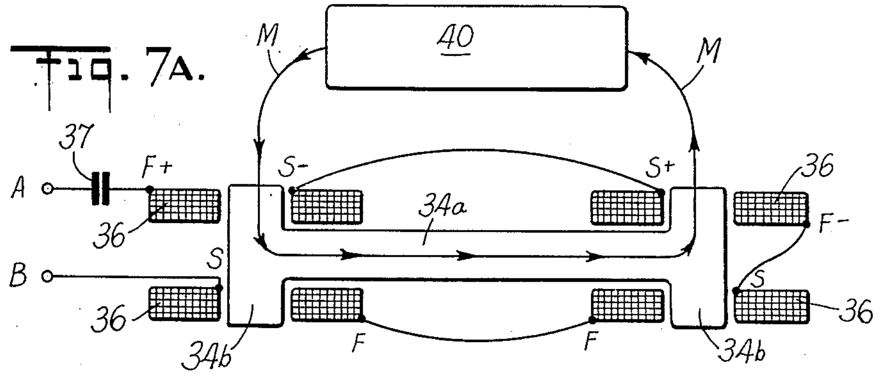
Figures 7A, 7B, 7C and 7D are diagrammatic views of the pickup coil arangement illustrating the effect of different magnetic fields thereon.

The voltages induced in the four coils 36 under the influence of various types of magnetic fields is shown in Figures 7A, 7B, 7C and 7D. Figure 7A illustrates the effect of magnetic flux emanating from the audio transformer 40 when the telephone cradle base is in proper position relative to the pickup device. Since the source of the flux is very close to the pickup transformer, the radius of curvature of the lines of force in the region of the pickup device is very short—so short, in fact, that at opposite ends of the coil arrangement the lines of force are predominantly of opposite direction or polarization. The core of the transformer furnishes a path of low reluctance for the lines of magnetic force M and tends to distort them into such conformation as will allow them to pass through the core for the greatest possible portion of their total path. Accordingly, the lines of force tend, as shown in Figure 7A, to enter through the upwardly directed end of one of the upright portions 34*b* of the core and depart through the upwardly directed end of the other upright portion 34*b*. In Figure 7A, as well as in Figures 7B, 7C and 7D, a certain direction or polarization of the field has been assumed for purposes of illustration. It has also been assumed that an upwardly directed field linking any of the coils 36 induces in that coil a voltage of such polarity that the terminal corresponding to the start or inside of the winding thereof—marked S in the drawings—would be at a relatively positive potential, and the finish or outside terminal—marked F—would be at a relatively negative potential. Conversely, a downwardly directed field in any coil would make its S terminal negative and its F terminal positive.

Accordingly, in Figure 7A, the F terminal of the upper left-hand coil will be positive, as indicated by the notation "+," while its S terminal will be negative or "−," as shown. Since the flux in the upper right-hand coil is oppositely directed, the coil will be oppositely polarized. However, it will be seen that corresponding terminals of the two coils, specifically the start or S terminals, are connected together, so that the coils tend to "buck" or oppose each other. The positive end of each coil is thus connected toward the terminal A of the pickup device and the negative end of each coil is connected toward the terminal B. The terminal A will therefore be positive with respect to the terminal B by a potential difference equal to the sum of the voltages induced in the two coils.

The shape of the core 34 is such that no appreciable density of flux will pass through the downwardly directed ends of the upright portions of the core and therefore no signals will be induced in the two coils thereon. Due to the close spacing of the pickup coils to the audio transformer 40 in the telephone cradle base, a large proportion of the total stray flux of the telephone transformer 40 will be caused to pass through the pickup coils in the manner indicated, and the coils accordingly will exhibit a high sensitivity to such flux, i. e. will develop an appreciable voltage corresponding to the telephone signals to be recorded.

Figure 7B:
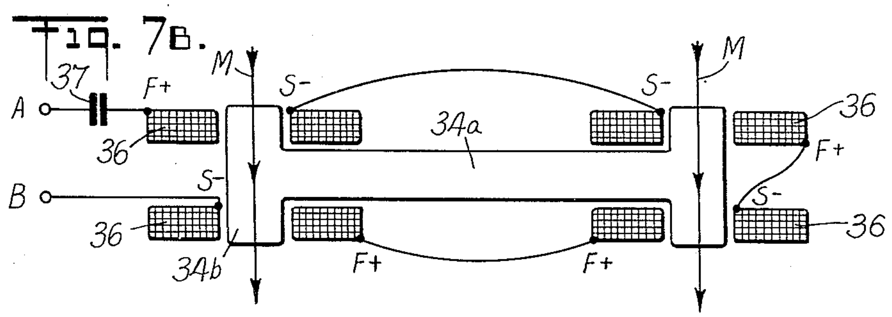

Figure 7B illustrates the effect on the pickup transformer of flux emanating from a source at a great distance from the transformer in the general direction of the axis of central portion 34*a* of the core, so that the lines of force in the field are vertical and substantially straight. In such case, flux of identical polarity and substantially equal density will pass lengthwise through each of the two upright portions 34*b*. A downwardly directed field has been assumed in Figure 7B. In such field, the F terminals of all coils are positive and their S terminals are negative. The interconnections of the coil are such that the voltages induced in the two coils on the left-hand upright portion tend to make terminal A positive with respect to terminal B, whereas the voltages induced in the two coils on the right-hand upright portion tend to make terminal A negative. The voltages in the two coils on the left-hand upright portion accordingly cancel or neutralize those in the coils on the right-hand upright portion, so that the algebraic sum of these voltages, which appears across terminals A and B, is substantially zero. It can thus be seen that the pickup arrangement has substantially no sensitivity to flux emanating from sources so positioned.

Figure 7C:
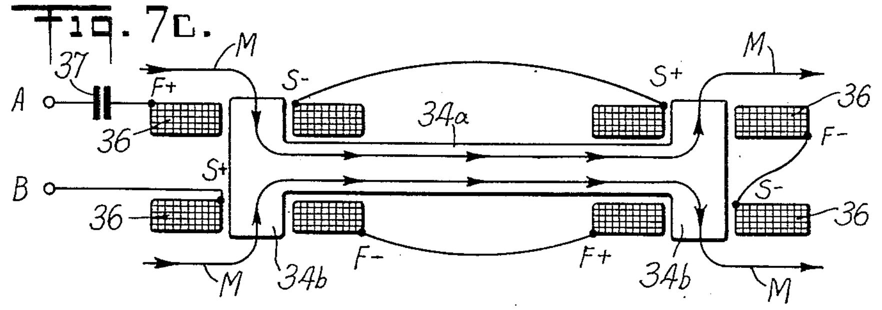

Figure 7C illustrates the effect on the pickup arrangement of flux emanating from a source at substantial distance in a direction generally perpendicular to the axis of central portion 34b of the core so that the lines of force will be horizontal and substantially straight. The ambient lines of force above the longitudinal axis of the core will, in seeking the path of least reluctance, be deformed so as to enter through the upper end of one of the upright portions 34b of the core and depart through the upper end of the opposite upright portion 34b. The ambient lines of force below the longitudinal axis of the core will enter through the lower end of one of the upright portions 34b of the core and depart through the lower end of the other upright portion 34b. A flux directed from left to right has been illustrated. As can be seen therefrom, the lines of force M are downward in the upper left-hand coil and upward in the upper right-hand coil. It will be appreciated that the direction of the lines of force in these two coils is the same as in Figure 7A. The voltage induced in the pickup coils by such flux, as explained in connection with that figure, tends to make terminal A positive with respect to the terminal B by a potential difference equal to the sum of the voltages induced in the two coils. The flux passing through the two lower coils is upward in the lower left-hand coil and downward in the lower right-hand coil. The voltages induced in each of the two lower coils is thus equal and opposite to the voltage induced in the two upper coils, so that the resultant voltage appearing across the terminals A and B is substantially zero.

Figure 7D:
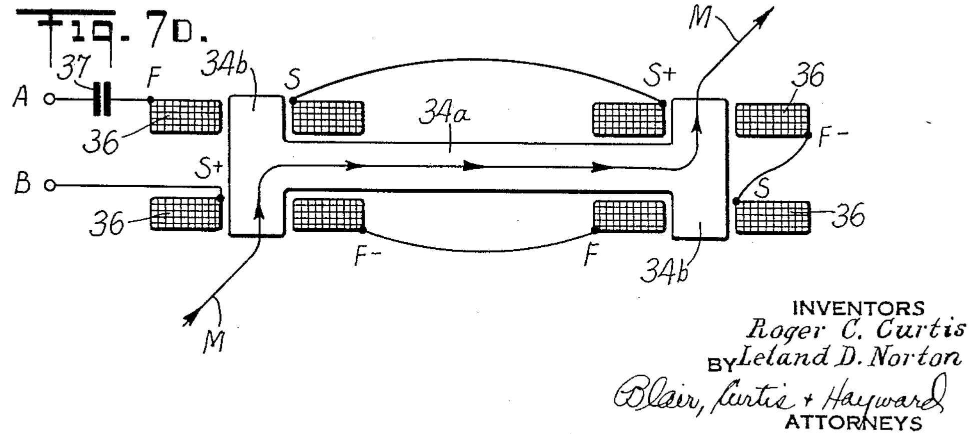

Figure 7D illustrates the effect on the pickup of a field emanating from a source at some distance in a direction oblique to the longitudinal axis of core 34, so that the lines of force are substantially straight and generally diagonal with respect to such axis. The lines of force will enter through the lower end of one of the upright portions and depart through the upper end of the other upright portion so that they are in the same direction in the coil of one upright portion as in the coil of the other. A direction from the lower left to the upper right has been assumed for the lines of force M. The lines of force in both the lower left-hand and upper right-hand coils are upwardly directed, so that the S terminals of both coils will be positive. Since the coils are connected in series opposition, with the S terminals connected toward opposite ends of the circuit, the induced voltages will cancel and the resultant voltage will be substantially zero.

It may therefore be seen that, no matter what the direction of the source of the magnetic field, so long as the field is substantially straight—as it will be when the source is spaced an appreciable distance from the pickup coils—the algebraic sum of the voltages induced in the pickup coils will be zero. The pickup device is accordingly sensitive only to magnetic fields emanating from sources in its immediate vicinity. Thus, while the device has a high sensitivity to local signals, such as those from the audio transformer 40 in the cradle base of the telephone, it rejects or discriminates against signals of remote origin, including a major portion of the incident electrical noise fields. The resulting relatively pure induced signals may be greatly amplified without raising the amplitude of the noise component thereof to an objectionable level.

There will thus be seen to have been provided a device whereby the aforementioned and other desirable objects have been achieved. However, it should be understood that the particular embodiment shown and described is intended as merely illustrative and in no way restrictive of the invention.

What is claimed is:

1. In a telephone system, an inductive coupling apparatus which is responsive selectively to telephone signals and discriminates against extraneous signals from other sources, said induction coupling apparatus comprising a magnetic flux generator responsive to a current containing information to be relayed and arranged to produce a magnetic field in accordance with the characteristics of said current, and a flux responsive device positioned adjacent but spaced from said flux generator, said generator and flux responsive device being so positioned relative to each other that all of the flux lines produced by said flux generator which couple to said flux responsive device extend through unshielded air coupling paths separating said generator from said flux responsive device, said flux responsive device being selectively responsive to flux originating adjacent thereto and including a core of magnetic material having a common central portion and first and second pairs of leg portions integrally connected to said central portion and projecting at an angle therefrom, said first pair of leg portions extending generally in the direction of said flux generator and the second pair of said leg portions extending in a direction generally away from said flux generator, and first, second, third, and fourth windings each coupled respectively to one of said leg portions so as to be selectively responsive to magnetic flux therein, said windings being serially connected in an output circuit in such manner that increasing lines of magnetic force having a given direction through said first pair of leg portions and linking said first and second windings will produce therein voltages which are additive in said output circuit and increasing lines of magnetic force extending in said given direction through said second pair of leg portions and linking said third and fourth windings will produce therein voltages which will oppose in said output circuit the voltages produced in said first and second windings.

2. In a telephone system, an inductive coupling apparatus which is responsive selectively to telephone signals and discriminates against extraneous signals from other sources, said induction coupling apparatus comprising a magnetic flux generator responsive to a current containing information to be relayed and arranged to produce a magnetic field in accordance with the characteristics of said current, and a flux responsive device positioned adjacent but spaced from said flux generator, said flux responsive device being selectively responsive to flux originating adjacent thereto and including a generally H-shaped core of magnetic material having a common central portion and first and second pairs of oppositely-disposed leg portions integrally connected to said central portion and projecting perpendicularly therefrom, said first pair of leg portions extending toward and the second pair of said leg portions extending away from said flux generator, first, second, third, and fourth windings each encircling respectively one of said leg portions so as to be selectively responsive to magnetic flux therein, and an output circuit including said windings connected in series in such manner that increasing lines of magnetic force having a given direction through said common central portion of said core and linking said first and second windings will produce therein voltages which are additive in said output circuit and increasing lines of magnetic force extending in said given direction through said common central portion of said core and linking said third and fourth windings will produce therein voltages which will oppose in said output circuit the voltages produced in said first and second windings.

3. In a telephone system, an inductive coupling apparatus which is responsive selectively to telephone signals and discriminates against extraneous signals from other sources, said induction coupling apparatus comprising a magnetic flux generator responsive to a current containing information to be relayed and arranged to produce a magnetic field in accordance with the characteristic of said current, and a flux responsive device positioned adjacent but spaced from said flux generator, said flux generator including an audio-frequency transformer having a core of magnetic material and a principal magnetic axis, said flux responsive device being selectively responsive to flux originated adjacent thereto and including a generally H-shaped core of magnetic material having a common central portion and first and second pairs of oppositely-disposed leg portions integrally connected to said central portion and projecting perpendicularly therefrom, said common central core portion being substantially the same length as said transformer core and having its longitudinal axis substantially parallel with said principal magnetic axis of said transformer core, said first pair of leg portions extending toward and the second pair of said leg portions extending away from said flux generator, first, second, third, and fourth windings each encircling respectively one of said leg portions so as to be selectively responsive to magnetic flux therein, and an output circuit including said windings connected in series in such manner that increasing lines of magnetic force having a given direction through said common central portion of said core and linking said first and second windings will produce therein voltages which are additive in said output circuit and increasing lines of magnetic force extending in said given direction through said common central portion of said core and linking said third and fourth windings will produce therein voltages which will oppose in said output circuit the voltages produced in said first and second windings.

4. Inductive coupling apparatus for use in conjunction with a telephone stand wherein the apparatus is selectively responsive to magnetic flux originating relatively close to the pick-up portion of the apparatus and is substantially less responsive to magnetic flux originating at relatively greater distances, said apparatus comprising a magnetic-flux generator for producing magnetic flux the intensity of which is a function of information to be transferred, and a flux responsive device positioned adjacent but spaced from said flux generator, said flux responsive device including a permeable core having a common central portion and first, second, third and fourth leg portions constructed integrally with said common portion and each projecting at an angle therefrom, said first and second leg portions being parallel and directed toward said flux generator, the ends of said first and second leg portions being near but spaced from said flux generator, said third and fourth leg portions being parallel and disposed oppositely from said first and second leg portions, four windings each magnetically coupled, respectively, to one of said leg portions, and an output circuit including said windings serially connected in such manner that a current flowing in said output circuit through said windings of said first and second leg portions would tend to produce a magnetic field in said common core portion extending in a given direction and said current flowing through said windings of said third and fourth leg portions would tend to produce a magnetic field in said common core opposing the magnetic field produced by the windings of said first and second leg portions.

ROGER C. CURTIS.
LELAND D. NORTON.

REFERENCES CITED

The following references are of record in the file of this patent:

UNITED STATES PATENTS

| Number | Name | Date |
|---|---|---|
| 1,196,223 | Fahy | Aug. 29, 1916 |
| 1,223,377 | Fahy | Apr. 24, 1917 |
| 2,005,788 | Keiser | June 25, 1935 |
| 2,047,863 | Finch | July 21, 1936 |
| 2,048,604 | Finch | July 21, 1936 |
| 2,282,461 | Dillenback | May 12, 1942 |
| 2,357,666 | Kuehni | Sept. 5, 1944 |
| 2,381,097 | Adams | Aug. 7, 1945 |
| 2,384,604 | Dann | Sept. 11, 1945 |